Figure 1:
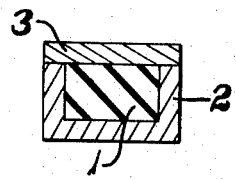

Feb. 17, 1959

S. T. SEMEGEN 2,873,481

METHOD OF MANUFACTURING A CELLULAR ARTICLE

Filed Aug. 4, 1954

INVENTOR.
STEPHEN T. SEMEGEN
BY
ATTY.

United States Patent Office 2,873,481
Patented Feb. 17, 1959

2,873,481

METHOD OF MANUFACTURING A CELLULAR ARTICLE

Stephen T. Semegen, Cuyahoga Falls, Ohio, assignor to The B. F. Goodrich Company, New York, N. Y., a corporation of New York Application August 4, 1954, Serial No. 447,909

8 Claims. (Cl. 18—53)

This invention relates to a method for making an abrasion resistant, flexible article of manufacture comprising a vulcanized, closed cell rubbery material. In particular, the present invention relates to a method for making an abrasion resistant, flexible article of manufacture having an even and smooth surface, comprising a vulcanized, closed cell, rubbery material useful as a shoe sole material.

Rubber soling used for sports shoes is generally soft and springy due to the large number of closed cells present and has a corrugated, roughened or wrinkled surface or tread to simulate crepe rubber. The configuration of the tread is usually imparted by the design incorporated in the mold or die and any unevenness of the surface or other imperfections caused by air becoming trapped between the surface of the rubber material in the mold and the interior surface of the mold itself or by imperfect blowing are lost in the design given to the sole. Accordingly, methods of blowing and vulcanizing soft rubber sole compositions are not too critical with respect to the surface condition of the sole although obviously soles having gross surface defects are not commercially satisfactory.

On the other hand, stiff rubber soling, made to simulate natural leather soling, must have a surface which is even, smooth and free of surface imperfections. It should also be flexible and can be either of the solid or unblown type or of the blown or expanded type in which it contains a smaller number of air or gas cells of the closed type and/or of smaller size than exhibited by the soft rubber soles. The expanded stiff rubber soles having a density several tenths less than the theoretical and usually having a density of about 1 or somewhat less are preferred since such soles have improved foot comfort and lightness under conditions of actual wear and reduced materials cost as compared to unblown or noncellular rubber or even leather soles. It, of course, is to be understood that stiff rubber soling is still flexible for it does not contain vulcanizing agents in an amount to render it rigid yet it is tough and wear-resistant due to the presence of fillers, resin, etc. The resins are important to stiffen and to strengthen the rubbery composition while the inert fillers act as extenders and possibly improve wear-resistance while making the composition more competitive with natural leather soling. It has been found, however, that when using known methods of blowing and vulcanizing the stiff rubber sole compositions, the surface of the sole or the tread is pimpled and uneven. If an excess of blowing agent is used to create more pressure in the composition against the mold, a degree of blow is obtained when the hot composition is pulled from the mold greater than that required in the final soling so that excessive softness results and the product no longer resembles leather. If the material is allowed to expand in the mold while vulcanization is being effected, the surface of the expanded stock is still wavy or pimpled. On the other hand, if the composition is allowed to cool in the mold, little if any blow is obtained due to the restraint on expansion of the rubber caused by the cooled thermoplastic resin and even then the surface is uneven and wrinkled. To reheat the composition so that the resin softens and permits expansion does not avoid such undersirable surface condition and is costly. Of course, it is apparent that reduction in the amount of, or elimination of, the resin will not provide a tough, strengthened rubber composition similar to natural leather soling. To remove the wrinkled surface by mechanical means such as by buffing is expensive and results in loss of soling material requiring the use of more material initially whereas coating the uneven, pimpled sole with a layer of the same or another composition to cover up the surface defects is uneconomical.

Accordingly, it is a primary object of the present invention to provide a method which overcomes the difficulties alluded to in the prior art and provides a cellular, flexible, rubbery composition having an even and smooth surface.

It is another object of this invention to provide a method for obtaining a stiff, flexible, cellular shoe sole composition comprising a rubber and exhibiting a smooth and even surface.

Yet another object is to provide a method for treating a stiff cellular rubber-resin composition shoe sole to obtain an even and smooth surface.

A further object is to provide stiff, cellular, flexible, rubber shoe sole compositions having an even and smooth surface.

These and other objects and advantages of the present invention will become more apparent to those skilled in the art from the following detailed description and examples.

Figure 2:
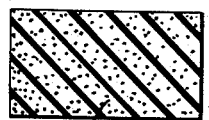
Figure 3:
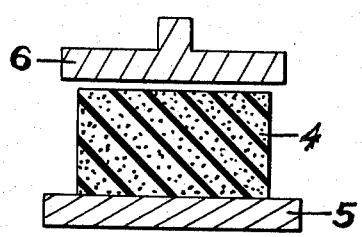
Figure 4:
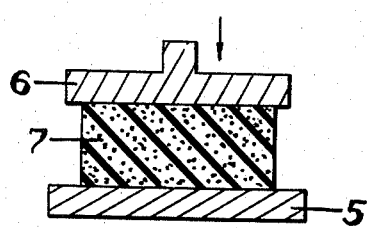

It has now been discovered according to the present invention that cellular, stiff, flexible, rubber shoe sole compositions can be obtained having an even and smooth surface finish or tread by heating a soft, unvulcanized, vulcanizable, expandable rubber composition containing from about 20 to 60 parts by weight, per 100 parts by weight of rubber, of a synthetic compatible thermoplastic resin in a closed mold which is essentially completely filled to vulcanize the rubber, plasticize the resin, and decompose the blowing agent, pulling the hot composition from the mold and permitting it to expand, and then pressing or compressing the expanded rubber composition somewhat without the application of additional heat and before it cools below the softening point of the resin to provide a density in the composition less than that exhibited by the unexpanded unvulcanized material but greater than that exhibited at the end of the expansion step and removing said pressed material after its temperature falls below the softening point of the resin. As shown in Figs. 1 to 4 of the drawing which illustrates one form of the present invention, rubber-resin composition 1 containing a blowing agent completely fills a mold comprising mold body 2 and cover 3. Sufficient heat for vulcanization of the rubber and decomposition of the blowing agent is then applied to the mold. After the heating step, the hot composition is removed from the mold and permitted to expand to form cellular enlarged article 4 as shown in Fig. 2. The hot expanded composition is then placed in a press having stationary bed plate 5 and moving platen 6 as shown in Fig. 3 and compressed by moving the platen toward the plate as shown in Fig. 4 and held under compression until cool to form cellular article 7 of the present invention having increased density and an even and smooth surface.

The rubbery material used in the composition of the present invention may be any vulcanizable naturally occurring crude rubber such as caoutchouc, which is essentially a rubbery polymer of isoprene, and the like, or such synthetic rubbers as the rubbery polymers of the open-chain conjugated dienes having from 4 to 8 carbon atoms such as the butadiene-1,3 hydrocarbons which include butadiene-1,3; isoprene; 2,3-dimethyl butadiene-1,3; 1,4-dimethyl butadiene-1,3; piperylene; and the like; chlorobutadiene-1,3; and mixtures thereof; or the copolymers of these and similar materials with each other or with such copolymerizable monomeric materials as isobutylene, styrene, methyl styrene, metachlorostyrene, acrylonitrile, methacrylonitrile, alpha chloroacrylonitrile, methyl acrylate, ethyl acrylate, butyl acrylate, methyl methacrylate, ethyl methacrylate, 2-vinyl pyridine and similar materials and mixtures thereof such as interpolymeric rubbery materials of butadiene-1,3, styrene and acrylonitrile. Mixtures of the natural and synthetic rubber homo-, co-, and interpolymers may also be used. The conjugated diene generally amounts to at least 50% in the synthetic rubbery polymers and preferably amounts to from about 55 to 85% by weight, the balance being the other co- or interpolymerizable olefinic monomer(s). Rubbery olefin polysulfide polymers such as "Thiokol" as well as rubbery polyacrylates may also be used. Of the copolymers used, it is preferable to employ the rubbery butadiene-1,3 and styrene copolymers.

The synthetic thermoplastic resinous material employed is compatible with the rubber. By "compatible" is meant that the resin blends with the rubber and does not separate therefrom on curing nor does it kill the cure of the rubber. The resinous material is a copolymer or an interpolymer of a major amount of an olefin with a minor amount of an open-chain conjugated diene and preferably should contain from about 65 to 90% by weight of the olefin. The olefin employed is a material such as styrene, methyl styrene, chloro and dichloro styrene, methoxy styrene, 1-vinyl 2-chloronaphthalene, and similar aryl olefines and substituted aryl olefines, vinyl pyridine, nuclear alkyl substituted vinyl pyridines such as 5-ethyl 2-vinyl pyridine, 4,6-dimethyl 2-vinyl pyridine, 5-methyl 2-vinyl pyridine and similar alkyl 2-vinyl pyridines in which the alkyl groups contain less than 10 carbon atoms, methyl methacrylate, butyl methacrylate, methyl ethacrylate and the like and mixtures thereof. The other monomer copolymerizable with the olefin is an open-chain conjugated diene containing from 4 to 8 carbon atoms such as butadiene-1,3; isoprene; 2,3-dimethyl butadiene-1,3; 3,4-dimethyl pentadiene-2,4; piperylene; 2-ethyl butadiene-1,3; 2-chlorobutadiene-1,3; and the like and mixtures thereof. Moreover mixtures of resinous co- and interpolymers likewise can be used. The resins such as the butadiene-styrene types can contain various polymerization aids and modifiers in minor amounts such as isohexyl mercaptan, di(sec. butyl) disulfide, tertiary dodecyl mercaptan, di-orthodinitrophenyl disulfide and the like.

Still other synthetic resinous materials may also be employed such as copolymers of a major amount of styrene and the balance isobutylene, which are particularly useful with "butyl" rubber, a copolymer of about 97½% by weight of isobutylene and the balance isoprene, or copolymers of a major amount of a low molecular weight alkyl methacrylate and a minor amount of an acrylic acid ester or alkyl acrylate and the like. Resins of polymers, mixed polymers or copolymers of vinyl chloride and vinylidene chloride and the like can also be used provided a sufficient amount of a plasticizer such as dioctyl phthalate, tricresyl phosphate, etc., is used to plasticize the vinyl.

The ratio of resin to rubber in the shoe sole composition described herein can vary from about 20 to 60 parts by weight of resin per 100 parts by weight of rubber. Less than about 20 parts of resin results in a shoe sole which is too soft to be comparable with natural leather soling and which does not maintain its dimensions while more than about 60 parts of resin produces a sole which is too hard and dense. Preferably, not less than about 25 parts and not more than 50 parts of resin should be used per 100 parts of rubber.

The blowing agent is preferably an organic blowing agent which decomposes to provide a gas at about the vulcanization point of the rubber. However, the organic blowing agent may decompose over a wide range since blowing agents exhibit vapor pressure curves at all temperatures higher than the initial decomposition temperature. Examples of organic blowing agents found useful are p-p'-oxybisphenylene sulfonyl hydrazide (Celogen), diazoamino benzene (Unicel), N,N'-dinitroso pentamethylene tetramine (Unicel ND), etc. However, inorganic blowing agents such as sodium bicarbonate may also be used. Silicon oxyhydride made by the Linde Air Products Co. may also be used and it provides an excellent soling product. Preferably it should be used in conjunction with an alkaline material as a catalyst but the accelerators normally used in rubber compounding are generally sufficient. The blowing agents are employed in an amount necessary to provide an expanded product somewhat larger in size when hot blown than ultimately desired. Preferably, there are used from about 2 to 5 parts by weight of blowing agent per 100 parts by weight of the rubber component of the composition. Less than about 2 parts of blowing agent results in insufficient reduction in density as well as lack of uniformity in distribution of cells and cell size. Where soft cellular soling is desired, the amount of blowing agent may vary up to about 6 to 8 parts by weight, or even up to 10 parts, per 100 parts by weight of the rubber component.

Other compounding ingredients are also added to the rubber-resin composition of the present invention, in amounts well known to the art, such as antioxidants, reinforcing pigments, pigment colors, fillers, extenders, inhibitors, accelerators, deodorants, vulcanizing agents and the like. Examples of such compounding ingredients are phenyl beta naphthylamine (Age Rite), aldol alpha naphthylamine (Age Rite Resin), polymerized trimethyl dihydroquinoline (Age Rite Resin D), 2-mercaptobenzothiazole disulfide (Altax), N-cyclohexyl-2-mercaptobenzothiazole sulfene amide (Santocure), polyaralkylated phenol (SPAR), 2-mercaptobenzothiazole (Captax), triethyl trimethylene triamine, triethylene tetraamine, zinc salt of mercaptobenzothiazole, melamine, precipitated silicon dioxide (Hi-Sil), precipitated calcium silicate (Silene), red iron oxide, yellow iron oxide, titanium dioxide, arc silica, silicon monoxide or "Monox," magnesium oxide, zinc oxide, clay, MPC black, EPC black, polymerized petroleum hydrocarbons (Resinex), coumarone indene type resins, stearic acid, tetramethyl thiuram disulfide (Methyl Tuads), tetraethyl thiuram disulfide (Ethyl Tuads), phthalic anhydride, triethanolamine, ground wood cellulose (Solka-Flock), glue, sulfur, light process oil, salicylic acid, sodium acetate, etc. In particular, the sulfur or zinc oxide should be present in an amount necessary to give a soft non-thermoplastic cure to the rubber or provide a flexible vulcanizate, not a rigid mass, and accordingly from about 2 to 5 parts by weight of vulcanizing agent per 100 parts by weight of rubber will be sufficient, 3.5 parts generally being employed. The inert filler such as clay, silica or calcium silicate may vary as necessary to obtain the desired ease of processing and to control cost since the soling produced by the present invention must be competitive with natural leather soling.

In preparing the composition for vulcanizing and blowing, all of the ingredients except the accelerator, blowing agent and vulcanizing agent are mixed together in a Banbury or on a rubber mill until a homogeneous appearing composition is obtained. The accelerator, blowing agent and vulcanizing agent may then be blended into the rubber-resin mix on a cold mill. The stock may then be tubed, extruded, and cut to a size essentially the same as the internal dimensions of the mold, that is, when the mold cover is placed on the mold the rubber-resin stock should completely fill the mold so that there are essentially no air pockets, that is, essentially no voids should remain. Preferably the stock is cut larger than the mold, about 5 to 10% greater volume, so that when the cover is placed thereon the excess stock is extruded out of the mold to result in a completely filled mold. Heat is then applied to the mold in an amount sufficient to decompose the blowing agent, vulcanize the stock and soften the resin. After the heat treatment step has been accomplished, the hot molded stock is withdrawn from the mold whereupon it expands and exhibits a pimply, uneven surface. It is next, while still hot and at least at a temperature at or above the softening point of the resin, pressed in a cold press, or in a press at a temperature less than the softening temperature of the resin, so that no additional external heat is supplied to the rubber to a density greater than that obtained in the expansion step but less than that when unvulcanized and unblown and allowed to remain in the cold press until cold or at least below the softening point of the resin. More than one piece of the hot expanded stock can be placed in the same mold and pressed at the same time. For example, the solid, unvulcanized, expandable mixture may have a density of from about 1.23 to 1.60 (where water has a density of one) while the hot, expanded, vulcanized mixture will have a density of from about .25 to .70. Cold pressing increases the final density to from about .80 to 1.15 which is satisfactory for stiff, cellular, smooth surfaced rubber soling. Preferably the density should be about .90 to 1.10 which provides the desired abrasion resistance and an even and smooth tread or surface. Soft soling can be hot pressed to a density of about .45. The cold pressing operation can, of course, be performed to get the desired degree of densification by controlling the amount of pressure applied and/or distance the platens move. The pressing operation apparently compresses the cells of the composition in one direction, in depth, as no appreciable change in length and width of the composition is noticeable. While it is generally only necessary to press in one direction, it is apparent that the hot expanded stock can be pressed from 2 or 3 directions simultaneously or consecutively. On cooling, the thermoplastic, which initially permitted the hot non-thermoplastic, expanded, cured rubber to be deformed, sets and holds the composition in its final stiff form. Without the presence of the thermoplastic resin, the rubbery composition could not be pressed as soft cured rubber shreds due to its inability when hot pressed of being able to evenly distribute stresses. The pressed cellular stiff rubber soling of the present invention is flexible, tough, leathery, and has an even and smooth finish similar to natural leather soling. It is as flexible as natural leather and its flex crack resistance is better than natural leather. It retains its shape and dimensions and exhibits excellent wear resistance. In fact, stiff cellular rubber soling prepared according to this invention outwears leather three to one. Preferably soling prepared according to the present invention will exhibit a Shore Durometer A hardness of from 85 to 95, although soling having a hardness of from 70 to 105 will be satisfactory. The cells in the product of the process of the present invention are of small size and are of generally uniform size. They are, also, substantially uniformly distributed throughout the composition.

The following examples will serve to illustrate the invention with more particularity to those skilled in the art:

*Example I*

A stiff shoe sole composition was prepared using conventional rubber equipment and procedures containing the following components in the amounts shown:

| Components: | Parts by weight |
|---|---|
| Rubbery copolymer (about 76½ parts by weight butadiene-1,3 and 23½ parts styrene-emulsified in rosin acid and hot salt acid coagulated) | 100 |
| Resinous copolymer of about 85 parts by weight of styrene and 15 parts of butadiene 1,3 | 44.5 |
| Hi-Sil | 64 |
| Red iron oxide | .85 |
| MPC black | .05 |
| Coumarone indene type extending resin | 10 |
| Zinc oxide | 3 |
| Solka-Flock | 3 |
| Stearic acid | 1.5 |
| Phthalic anhydride | 1 |
| Age Rite Resin | 2 |
| Titanium dioxide | 5 |
| Yellow iron oxide | 2.25 |
| Clay | 6.4 |
| Triethanol amine | 2 |
| Santocure | 1.5 |
| Methyl Tuads | 0.1 |
| Sulfur | 3.5 |
| Celogen | 4 |

All the components were mixed in a Banbury except the accelerator, blowing agent and vulcanizing agent which were mixed on a roll mill having cooling water circulating constantly through the rolls. Slugs were cut from the composition and charged to a mold of about size 10½ iron lubricated with regular factory lubricants. A solid sole of this size weighs about 200 g. The mold was closed and excess rubber was squeezed into overflow rind cavities provided on the mold and the mold was heated to 340° F. for 10 minutes. After curing, the sole was removed hot which permitted it to expand, resulting in a 3-dimensional blow, to about 15 iron size, and it exhibited a surface which was pimpled, uneven and wavy. The above sole was placed immediately, while still hot, in a cold sheet mold of 12 iron thickness. Pressure was applied, minimum available, and the pressed sole was allowed to cool for several minutes until it was well below the softening point of the resin. On removal from the cooling press, the surface of the sole was very smooth, even and similar to natural leather soling. It exhibited excellent blow and cell structure and was flexible. The sole was 12 iron about size 12 and had been reduced in density from the solid state of 1.26 to .94 after cold pressing. It exhibited a Shore A Durometer hardness of 86. The soling material was seasily dyed and fastened to shoe bottoms using conventional adhesives, cements and stitching. It, also, was easily turned and handled with shoe factory equipment.

*Example II*

The method of this example was the same as that of Example I, above, except that the types and amounts of components were varied and glue was added to the composition:

| Components: | Parts by weight |
|---|---|
| Rubbery copolymer of 57% by weight of butadiene-1,3 and the balance styrene—hot alum coagulated | 100 |
| Resinous copolymer of 85% by weight of styrene and the balance butadiene-1,3 | 39 |
| Animal glue | 20 |
| Hi-Sil | 65 |
| Red iron oxide | 3.3 |
| MPC black | .15 |
| Resinex | 5 |
| Zinc oxide | 5 |
| Stearic acid | 1.5 |
| Age Rite Resin | 1 |
| Yellow iron oxide | 15 |
| Altax | 1.75 |
| Methyl Tuads | 0.2 |
| Sulfur | 3.5 |
| Celogen | 4 |

In this example, the glue was also added as a 1-part glue 2-parts rubber masterbatch mixed on a factory mill. Although 5% water was added to help disperse the glue in the rubber, it was driven off by the heat of milling. After hot molding, heating, and expanding, the hot sole exhibited an uneven and wavy surface. After cold pressing and cooling the hot expanded shoe sole composition, it was examined and found to have an even and smooth surface and appeared similar to natural leather soling. Its density was 0.93 and its Shore A Durometer hardness was 89. It was flexible. This stiff cellular soling was as satisfactory as that prepared following the method of Example I. Larger amounts of glue can be used. However, above about 50 parts of glue per 100 parts of rubber in the above composition, the resulting sole becomes slippery when wet so that below about this limit represents the largest concentration of glue to employ in the composition.

*Example III*

The method of preparing shoe soles of this example was the same as Example I, above, except that the types and amounts of the components were again varied as shown below:

| Components: | Parts by weight |
|---|---|
| Rubbery copolymer of about 57% by weight of butadiene-1,3 and the balance styrene—hot alum coagulated | 100 |
| Resinous copolymer of about 85% by weight of styrene and the balance butadiene-1,3 | 37.5 |
| Hi-Sil | 65 |
| Red iron oxide | 3.3 |
| MPC black | 0.15 |
| Altax | 1.75 |
| Zinc oxide | 5 |
| Yellow iron oxide | 15 |
| Stearic acid | 1.5 |
| Resinex | 5 |
| Age Rite Resin D | 1 |
| Methyl Tuads | 0.2 |
| Sulfur | 3.5 |
| Celogen | 3 |

The hot expanded composition shoe sole after cold pressing was flexible, had a smooth and even surface and an excellent closed cell structure. The feel and appearance of the sole was similar to natural leather. Its density was about .93. When only 30 parts of resin were used, a similar closed cell composition shoe sole was obtained on cold pressing. However, its density was about 1.04. Its wear resistance and surface finish were just as good as the lighter sole.

*Example IV*

The method of this example was the same as that of Example I, above, except that variations were made in the types and amounts of the components of the composition, particularly in the amount of blowing agent as shown below:

| Components: | Parts by weight |
|---|---|
| Rubbery copolymer of about 57% by weight of butadiene-1,3 and the balance styrene—hot alum coagulated | 100 |
| Resinous copolymer of about 85 parts by weight styrene and the balance butadiene-1,3 | 40 |
| Hi-Sil | 65 |
| Red iron oxide | 3.3 |
| MPC black | 0.15 |
| Altax | 1.75 |
| Zinc oxide | 5 |
| Yellow iron oxide | 15 |
| Stearic acid | 1.5 |
| Resinex | 5 |
| Age Rite Resin D | 1 |
| Methyl Tuads | 0.2 |
| Sulfur | 3.5 |
| Celogen | 4 |

The closed cell shoe sole composition prepared according to this example had a fine smooth surface after cold pressing the hot expanded composition and exhibited a Shore A Durometer hardness of 75. It was flexible and similar to natural leather soling. With the same composition and only 3 parts of blowing agent, a cellular shoe sole composition of similar surface appearance was obtained having a Shore A Durometer hardness of 85. Both finished soles had a density less than 1.0. When only 2 parts of the blowing agent were used, the surface appearance of the shoe sole was equal to that exhibited by the foregoing and it had a Shore A hardness of 88. It also exhibited an excellent cell structure although its density was slightly greater than 1.0. However, less than about 2 parts of blowing agent per 100 parts of rubber will result in insufficient reduction in density and type and distribution of cells.

*Example V*

The method of this example was the same as that of Example I except that the following variations in components and their amounts were made:

| Components: | Parts by weight |
|---|---|
| Rubbery copolymer of about 75% by weight of butadiene-1,3 and the balance styrene—fatty acid emulsified | 40 |
| Rubbery copolymer of about 57% by weight of butadiene-1,3 and the balance styrene—hot alum coagulated | 40 |
| Natural rubber smoked sheet | 20 |
| Resinous copolymer of about 85% by weight of styrene and the balance butadiene-1,3 | 20 |
| Red iron oxide | 0.8 |
| EPC black | 0.05 |
| Clay | 215 |
| Zinc oxide | 5 |
| Yellow iron oxide | 2.25 |
| Titanium dioxide | 5 |
| Altax | 2 |
| Salicylic acid | 1 |
| Age Rite Resin D | 1 |
| Sodium acetate | 0.65 |
| Light process oil | 18 |
| Sulfur | 3.5 |
| Celogen | 3.5 |

The cold pressed hot expanded closed cell shoe sole composition had a smooth and even surface, a density greater than about 1.0, a Shore A hardness of 70 and an excellent cell structure. Its flexibility and wear-resistance were good and its appearance was similar to that of leather soling. This example illustrates that satisfactory soling can be obtained using a high loading of filler, less resin, and blends of several rubbers.

*Example VI*

The following composition was prepared and treated according to the method of Example I:

| Components: | Parts by weight |
|---|---|
| Rubbery copolymer of about 67% by weight of butadiene-1,3 and the balance acrylonitrile with 3% polyaralkylated phenol | 100 |
| Resinous copolymer of about 85% by weight of styrene and the balance butadiene-1,3 | 50 |
| Silene | 65 |
| Red iron oxide | 3 |
| Yellow iron oxide | 15 |
| MPC black | 0.1 |
| Zinc oxide | 5 |
| Stearic acid | 1.5 |
| Altax | 1 |
| Methyl Tuads | 0.5 |
| Sulfur | 2 |
| Celogen | 3 |

The cold pressed hot cellular composition exhibited an even, smooth surface, excellent cell structure, a Shore A hardness of about 85, and a density of about 1.0. It was similar to natural leather soling and was flexible. This experiment illustrates that nitrile rubbers can be employed as well as styrene rubbers to give excellent stiff cellular shoe soles.

*Example VII*

The following composition was also prepared and treated according to method of Example I:

| Components: | Parts by weight |
|---|---|
| Rubbery copolymer of about 97.5% by weight of isobutylene and the balance isoprene | 100 |
| Resinous copolymer of about 60% by weight of styrene and the balance isobutylene | 50 |
| Hi-Sil | 65 |
| Red iron oxide | 3 |
| Yellow iron oxide | 15 |
| MPC black | 0.1 |
| Zinc oxide | 5 |
| Stearic acid | 1.5 |
| Captax | 2 |
| Methyl Tuads | 0.5 |
| Sulfur | 3.5 |
| Celogen | 3 |

The cold pressed hot expanded cellular shoe sole composition of this example had a Shore A Durometer hardness of about 83, an even and smooth surface, an excellent cell structure and a density of about 1.0. It was similar to natural leather soling and was flexible.

In summary, the present invention teaches that a stiff cellular shoe sole composition having an even and smooth surface and similar to natural leather can readily be obtained by filling completely or essentially completely, a mold with an expandable vulcanizable rubbery composition containing a synthetic thermoplastic resin in minor amounts, applying sufficient heat to vulcanize and expand the composition on release from the mold, pulling the hot composition from the mold and compressing it in a press, without the addition of any heat, or which is at least at a temperature well below the softening point of the resin, and allowing the composition to cool while under pressure to a temperature below the softening point of the resin. The composition sole prepared according to the method of the present invention has good flexibility and high abrasion resistance. It can be readily dyed, cemented and/or sewed to the shoe bottoms. While the method of the present invention has been directed primarily to the treatment of stiff shoe soling, it is apparent that it will be applicable to obtaining even and smooth surfaces on soft cellular shoe soling compositions. The product of the method of the present invention can also be used to make floor tiling, padding, upholstery, rug backing, luggage, insulation and the like.

What is claimed is:

1. The method for making a flexible closed cell composition useful for shoe soles which comprises filling a mold with a solid, vulcanizable unvulcanized expandable composition having a density of from about 1.23 to 1.60 in an amount at least sufficient to essentially completely fill said mold when closed, said composition containing from about 20 to 60 parts by weight of a compatible thermoplastic synthetic resin per 100 parts by weight of rubber, a vulcanizing agent in an amount of from about 2 to 5 parts by weight per 100 parts by weight of said rubber to provide a vulcanized flexible composition on vulcanization and a blowing agent in an amount of from about 2 to 10 parts by weight per 100 parts by weight of said rubber to form an expanded closed cell composition on decomposition of said blowing agent and on release of said composition from said mold, closing said mold, applying sufficient heat to said composition in said closed mold to vulcanize said composition, to plasticize said resin and to decompose said blowing agent, releasing said composition from said mold while said composition is at an elevated temperature above the softening point of said resin and permitting it to expand to form a cellular composition, compressing said cellular composition having a temperature not less than the softening point of said thermoplastic resin in at least one direction without the application of additional external heat to obtain a density for said composition of from about 0.45 to 1.15 and which is greater than that obtained at the end of said expansion step but less than that exhibited by said unvulcanized vulcanizable expandable composition and to obtain an even and smooth surface, and allowing said pressed composition to cool under pressure to a temperature below the softening point of said thermoplastic resin, said densities being based on water having a density of one.

2. The method of making a stiff, flexible, closed cell composition useful for shoe soles which comprises filling a mold with a solid, vulcanizable, unvulcanized expandable composition having a density of from about 1.23 to 1.60 in an amount at least sufficient to essentially completely fill said mold when closed, said composition containing from about 25 to 50 parts by weight of a compatible thermoplastic synthetic resin per 100 parts by weight of rubber, a vulcanizing agent in an amount of from about 2 to 5 parts by weight per 100 parts by weight of said rubber to provide a vulcanized, flexible composition on vulcanization and a blowing agent in an amount of from about 2 to 5 parts by weight per 100 parts by weight of said rubber to form a closed cell expanded composition on decomposition of said blowing agent and on release of said composition from said mold, closing said mold, applying sufficient heat to said composition in said mold to vulcanize said composition, to plasticize said resin and to decompose said blowing agent, releasing said composition from said mold while said composition is at an elevated temperature above the softening point of said resin and permitting it to expand to form a cellular composition, compressing said cellular composition while it is a temperature not less than the softening point of said thermoplastic resin in at least one direction without the application of additional external heat to obtain a density for said composition of from about 0.80 to 1.15 and which is greater than that obtained at the end of said expansion step but less than that exhibited by said unvulcanized, vulcanizable, expandable composition and to obtain an even and smooth surface, and allowing said pressed composition to cool under pressure to a temperature below the softening point of said thermoplastic resin, said densities being based on water having a density of one and the resulting pressed cooled expanded composition having a Shore A Durometer hardness of from 70 to 105.

3. The method according to claim 2 in which said rubbery composition comprises a copolymer of from about 55 to 85% by weight of butadiene-1,3 and the balance styrene and in which said resin comprises a copolymer of from about 65 to 90% by weight of styrene and the balance butadiene-1,3.

4. The method according to claim 3 in which said rubbery composition comprises a copolymer of about 58% by weight of butadien-1,3 and the balance styrene and said resin comprises a copolymer of about 85% by weight of styrene and the balance butadiene-1,3.

5. The method according to claim 3 in which said rubbery composition comprises a copolymer of about 77% by weight of butadiene-1,3 and the balance styrene and said resin comprises a copolymer of about 85% by weight of styrene and the balance butadiene-1,3.

6. The method according to claim 2 in which said hot cellular composition is compressed during said compression step to a density from about 0.90 to 1.10 and said resulting pressed cooled expanded composition having a Shore A Durometer hardness of from 85 to 95.

7. The method according to claim 2 in which said expanded composition is compressed in a cold mold.

8. The method according to claim 2 in which said mold is filled to overflowing with said rubbery composition and on closing said mold the excess is squeezed out to leave the mold completely filled.

References Cited in the file of this patent
UNITED STATES PATENTS

| | | |
|---|---|---|
| 2,283,316 | Cooper | May 19, 1942 |
| 2,287,193 | Overstreet | June 23, 1942 |
| 2,297,018 | Overstreet | Sept. 29, 1942 |
| 2,336,944 | Madge | Dec. 14, 1943 |
| 2,384,387 | Meyer | Sept. 4, 1945 |
| 2,405,345 | Cooper et al. | Aug. 6, 1946 |
| 2,570,182 | Daly | Oct. 9, 1951 |
| 2,632,210 | Olson | Mar. 24, 1953 |